Aug. 19, 1969     T. M. HOLLOWAY     3,461,896
FLUID PROPORTIONAL CONTROLLER
Filed July 1, 1966
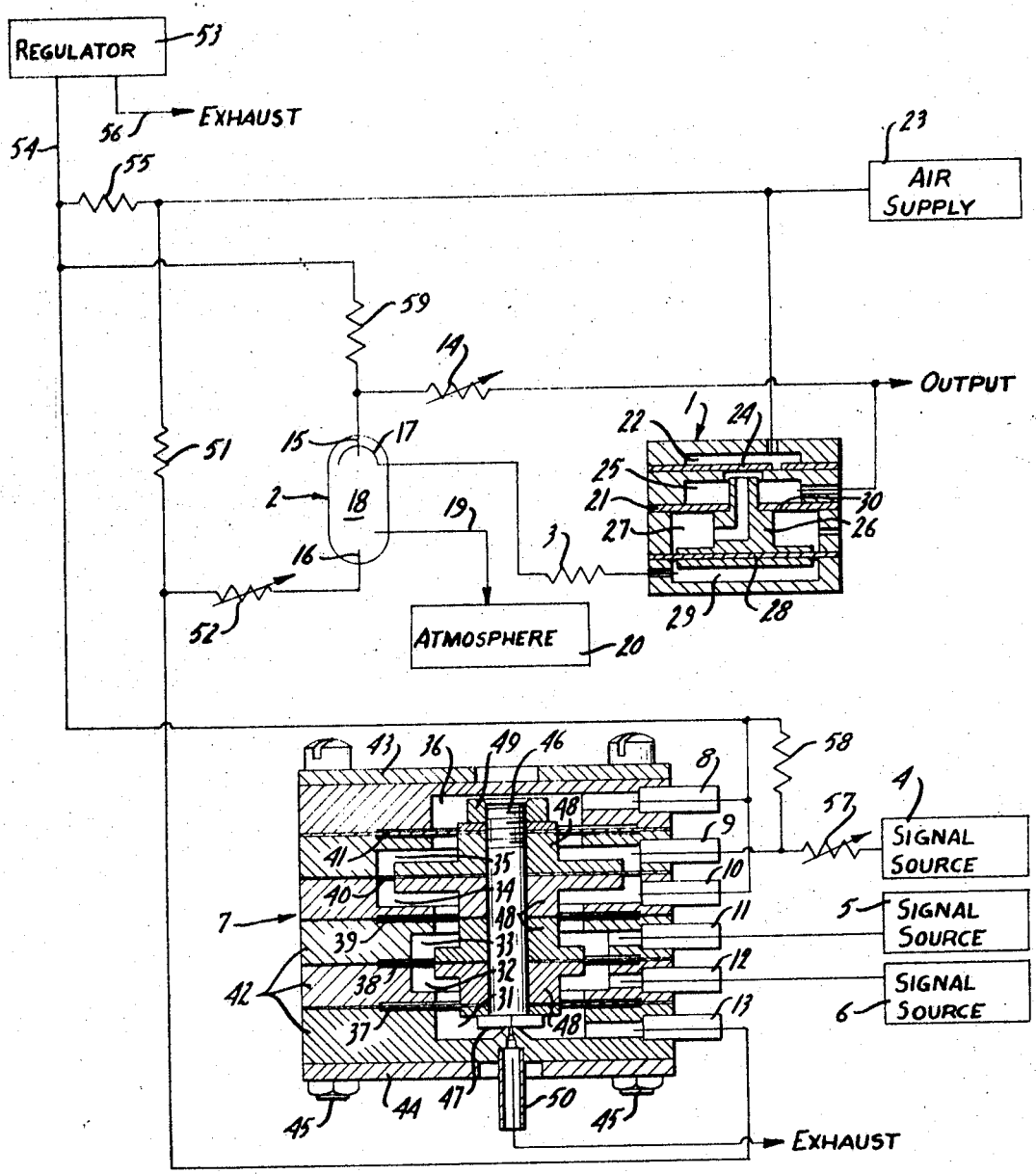
INVENTOR
*Thomas M. Holloway*
BY
*Andrus & Starke*
*Attorneys*

United States Patent Office 3,461,896
Patented Aug. 19, 1969

3,461,896
FLUID PROPORTIONAL CONTROLLER
Thomas M. Holloway, Waukesha, Wis., assignor to Johnson Service Company, Milwaukee, Wis., a corporation of Wisconsin
Filed July 1, 1966, Ser. No. 562,252
Int. Cl. F15c 1/20
U.S. Cl. 137—81.5           5 Claims

ABSTRACT OF THE DISCLOSURE

The present disclosure relates to a porportional controller having a summing impact modulator connected to sum the signal from an input comparator and a feedback signal path with the output signal applied to a pneumatic amplifier. The input comparator is by a multiple diaphragm comparator having dead-ended signal chambers. The output of the summing impact modulator is connected to a dead-ended chamber of a leakport relay which is connected to an external power supply and provides the controller output. The output is fed back through a needle valve to the nozzle of the impact modulator which is opposite that to which the comparator output is connected. Adjustment of the needle valve provides for the overall controller gain adjustment.

---

The present invention relates to a fluid proportional controller and particularly to a fluid controller employing pneumatic comparators and relays in combination with a pure fluid summating device.

A variety of pure fluid active elements have been recently created and suggested for simulating the active elements of electrical circuits such as vacuum tubes and transmitting devices with the devices interconnected to similarly form various functions. Such pure fluid devices have been interconnected to produce amplification, integration, differentiation and the like.

An unusually satisfactory pure fluid controller is shown in the copending application of Bjorn G. Bjornsen entitled Pure Fluid Summing Impact Modulator and Universal Amplifiers Constructed Therewith which was filed on Jan. 25, 1965 with Ser. No. 427,589, Patent No. 3,388,713, and is assigned to the same assignee as the present application. As more fully disclosed therein, the pure fluid device employs a special impact modulator as a fluid signal summing device. An impact modulator is a pure fluid device employing a pair of opposing streams to establish a balance or impact position, with the balance position being highly sensitive to the relative strength of the two streams. By varying the relative strength of the two streams the balance position can be varied and the change can be sensed to provide an amplified output control signal. Of particular significance in the above disclosure is the teaching of the use of the impact modulator as a summing device wherein a signal is either added by application to one stream nozzle or subtracted by application to the opposite stream nozzle. Generally, a plurality of signals are applied to the two impacting nozzles of the summing impact modulator through suitable linear input restrictors. These input restrictors must have a high resistance value in order to minimize the input signal flow from the signal sources. The output of the summing impact modulator is connected to an amplifying means to increase the operating level of the signal and connected in a feedback network to produce an operational amplifier. The impact modulator provided a means of summating signals and provides a highly satisfactory device for use in connection with amplifying systems wherein a portion of the output signal is fed back to provide a highly reliable pure fluid device or operational amplifier.

Although the prior art pure fluid devices and particularly that of the above application have many advantages, the system was found to be sensitive to temperature and to suffer as a result of signal losses occurring in the multiple input signal system to the summing impact modulator.

It is the object of the present invention to provide a fluid proportional amplifier or controller in which the summing impact modulator is retained to sum the input signals and a feedback signal to provide an error signal applied to a pneumatic amplifier. Of particular significance in the present invention is the summation of the input signal by a multiple diaphragm type comparator or the like which has an infinite input impedance. The summing impact modulator summates the signal from the comparator and the feedback signal. This eliminates loading of the input signal transmission devices and lines and consequently any of the errors heretofore introduced as a result of transmission line losses and further stabilizes the system with respect to temperature changes.

In a preferred embodiment of the present invention, the summing impact modulator is provided as the summing element at the error junction. The input signals are applied to a multiple diaphragm operated comparator to provide a single output proportional to the summations thereof and which output in turn is connected to one of the nozzles of the impact modulator. The output of the summing impact modulator is connected to a conventional pneumatic relay which is connected to an external power supply and provides the controller output. The output is fed back through an adjustable pneumatic restrictor to the nozzle of the impact modulator which is opposite that to which the comparator output is connected. Adjustment of the needle valve provides for the overall controller gain adjustment.

In accordance with the present invention, the feedback nozzle is also connected to a regulated pressure supply through a linear pneumatic bias resistor, to attain a predetermined average feedback nozzle pressure, thereby, minimizing the need for recalibrating of the controller set point pressure following gain adjustment.

In accordance with one feature of this invention, individual gain adjustment may be established by similarly biasing the inputs through suitable linear restrictors from the regulated pressure source, and interconnecting the inputs from the signal sources through adjustable restrictors. This provides for individual adjustable gains without having the gain adjustment vary the average comparator input levels.

The present invention thus provides a combined fluidic and conventional pneumatic controller avoiding difficulties present in the pure fluidic systems.

The drawing furnished herewith illustrates a preferred construction of the invention in which the above advantages and features are set forth as well as others which will be clear from the following description of the drawing.

The drawing is a schematic flow diagram of an operational amplifier or proportional controller constructed in accordance with the present invention.

In the drawing, the fluid proportional controller employs negative feedback around a high gain amplifying element. Although the system can operate with a multitude of fluids, it is particularly described with the use of air. Generally, in the illustrated embodiment of the invention, the forward gain element consists of a well known pneumatic relay 1 similar to that shown in applicant's previously referred to copending application together with the gain provided by a summing impact modulator 2. The summing impact modulator 2 is connected to the input of the pneumatic relay 1 in series with a fixed fluid restrictor or resistor 3. A plurality of input signal sources 4, 5 and 6 are shown and connected to the summing modulator 2 through a multiple diaphragm comparator 7. The illustrated comparator 7 includes six signal taps, five of which are input taps 8, 9, 10 and 11 and 12 and one of which is an output tap 13 connected to the one side of the summing impact modulator 2. A feedback impedance 14 interconnects the output of the pneumatic relay 1 to the opposite side of the summing impact modulator 2 to provide negative feedback.

In operation, the several input signals to the comparator 7 are summed by the comparator and provide a single proportional signal at tap 13 and thus to the summing impact modulator 2. This in turn is compared with the feedback signal transmitted via impedance 14. The output of the summing impact modulator is proportional to the difference between the summated input signal and the feedback signal and operates the pneumatic relay 1 to provide the desired output characteristics.

More particularly, in the illustrated embodiment of the invention, the diagrammatically illustarted summing impact modulator 2 includes a pair of opposed nozzles 15 and 16 mounted in opposed relation and adapted to establish air streams having an impacting balance position with respect to a collector 17. The balance position with respect to such collector 17 is highly dependent on the relative strength of the two streams, not shown, and produces an output signal in the collector 17 proportional to the relative strength of the two streams. The modulator 2 includes a reference chamber 18 which is connected by a tap 19 to a suitable reference pressure, shown diagrammatically as atmosphere 20.

The pneumatic relay 1 is a well known device having a body portion 21 within which a main air chamber 22 is provided and connected to an air supply 23. A flapper valve 24 is biased to normally close an opening from the chamber 22 to an output chamber 25. The flapper valve 24 is selectively and mechanically positioned by a diaphragm actuated member 26 which projects upwardly through a reference chamber 27 and the output chamber 25. The member 26 is stepped in cross section and includes a relatively large base secured to a diaphragm 28 forming the upper wall of a control chamber 29. A diaphragm 30 which forms the lower wall of chamber 25 is connected to a reduced portion of member 26.

The output of the summing impact modulator 2 is connected to the control chamber 29 and establishes a pressure therein proportional to the output of the summing impact modulator 2.

In the illustrated embodiment of the invention, the effective area of the member 26 at diaphragm 28 is substantially larger than that secured to the output chamber diaphragm 30. The output pressure from modulator 2 moves and positions the member 26 upwardly engaging the flapper valve 24 in accordance with the relative forces on the diaphragms and thereby throttles the supply air through the output chamber 25 to the load. Amplification generally in the ratio of these effective areas of diaphragms 28 and 30 is obtained with regard to the input signal pressure of the summing modulator 2 and the output pressure.

The pneumatic relay 1 is made responsive to the summation of the three input signals and a feedback signal, i.e. the error signal. The three input signals are connected to the comparator 7 and provide a summated signal to the nozzle 16 of the summing impact modulator. The gain adjustment resistor 14 which may be a needle valve or the like connects the output of the pneumatic relay 1 back to the nozzle 15 of the summing impact modulator 2 to provide negative feedback with respect to the summated signal from the comparator 7.

The multiple diaphragm pneumatic comparator 7 is shown having six chambers 31-36, inclusive, defined by five diaphragms 37-41, inclusive. The several diaphragms are clamped in spaced relation to each other and between cylindrical diaphragm plates 42 by top and bottom clamping plates 43 and 44 and suitable clamping nut and bolt units 45. The several diaphragm plates 42 are formed with corresponding opposed recesses to provide generally similar control chambers on opposite sides of the diaphragms.

The diaphragms include central apertures through which a valve bolt stem 46 extends. The lower end of the stem 46 forms a valve seat 47. The input taps 8-13 are connected to the several chambers for establishing pressure signals in the several chambers and positioning of the valve stem 46 and particularly valve seat 47 with respect to an exhaust nozzle 50.

Annular stepped spacers 48 are disposed within the respective chambers 31-36 encircling the stem 46 to reinforce the diaphragms. The axial length of the spacers 48 generally corresponds to the thickness of the diaphragm plates.

A nut 49 is secured to the opposite or upper end of the bolt stem 46. Tightening of the nut 49 clamps the valve stem 46, and seat 47, to the several diaphragms 37-41, inclusive, for movement as a unit in accordance with the pressure signals in the chambers.

The exhaust nozzle 50 is connected to the lower chamber 31 and terminates in an orifice aligned with the valve seat 47. Tap 13 to chamber 31 is connected via a restrictor 51 to the air supply 23 and to the nozzle 16 via an adjustable field calibration restrictor 52. The position of the valve seat 47 within the chamber 31 therefore controls the exhaust of the supply pressure and thereby the signal applied via restrictor 52 to nozzle 16.

The signal sources 5 and 6 are connected respectively to the chambers 32 and 33 via the taps 12 and 11. Chambers 32 and 33 are shown as essentially identically sized chambers and with larger effective areas at the common diaphragm 38 than at the outer diaphragms 37 and 39. The signals at taps 11 and 12 thus provide similar opposing pressures which balance each other to provide a proportional difference signal on the positioning of the valve seat 47 and therefore the exhaust of the supply pressure through the tap 13.

The chambers 34 and 36 are connected in parallel to a pressure regulator 53. The chamber 36 includes a relatively small effective area of diaphragm 41 whereas the chamber 34 has a large effective area at diaphragm 40 and an effective area at diaphragm 39 corresponding to that at diaphragm 41. As a result, the regulated supply prebiases the stem 46 and attached valve seat 47 upwardly to open the exhaust nozzle 50 in the absence of a signal from the sources 4-6, inclusive.

The illustrated regulator 53 is of the exhaust control variety having an input-output line 54 connected to the air supply 23 in series with a restrictor 55. An exhaust line 56 is provided and variably connected to line 54 to maintain a regulated pressure at line 54. Such regulators are readily available and well known and no further description thereof is given.

The chamber 35 which is between the chambers 34 and 36 is connected to the signal source 4 through an adjustable gain control restrictor 57 and to the regulated supply line 54 through a fixed restrictor 58. The signal chamber 35 is biased to a regulated pressure and the gain of the system with respect to the signal from source 4 is dependent upon the adjustment of the restrictor 57. In an embodiment of the invention constructed in the drawing the gain ratio for the signal of source 4 was continuously adjustable from a three to one ratio to a zero to one ratio by adjustment of the restrictor 57.

The chamber includes a substantially greater effective area at the common diaphragm 40 than at the outer wall diaphragm 41 and the pressure therein tends to close the exhaust nozzle 50 and increase the level of the signal to the nozzle 16 of the summing impact modulator 2.

The amplifier constructed in accordance with the present invention also has the regulated supply 53 connected to the feedback nozzle 15 to bias the set point pressure of the summing impact modulator 2. The set point pressure is the average pressure value about which the output pressure of the controller varies. This in turn is determined by the average pressure output of the summing impact modulator which is dependent upon the average feedback pressure at nozzle 15 and the summated input pressure at the nozzle 16. The feedback nozzle 15 is connected through a fixed linear restrictor 59 to the regulated pressure supply line 54. The biasing signal established thereby provides a selected predetermined average feedback pressure to the feedback nozzle 15. The set point is therefore primarily established by the restrictor 59 and calibration restrictor 52 and minimizes the need for recalibration of the controller set point pressure with adjustment of the feedback restrictor 14 for varying the feedback gain.

The operation of the illustrated embodiment of the invention may be briefly summarized as follows.

The regulator 53 biases the comparator 7 and the summing impact modulator 2 to provide a selected output signal to the pneumatic relay 1. The particular level of operation or set point is determined by the setting of the field calibration restrictor 52 and feedback restrictor 14. The connection of the feedback nozzle 15 of the modulator 2 to the pressure regulator through the restrictor 59 provides an average feedback signal related to the adjustment of the field calibration restrictor 52 about which the controller output varies in response to the summated signal from the comparator 7.

When all three signals are applied to the comparator, the several forces on the diaphragm reposition the valve seat 47 in accordance with the total relative pressures and effective areas. As the signals are into essentially closed chambers, the comparator practically has an infinite input impedance and essentially no signal flow is required. This eliminates loading of the input signal transmission lines and devices and eliminates the errors encountered in the pure fluid systems.

The summated signal is applied to nozzle 16 of the summing impact modulator 2. The strength of the stream from the nozzle 16 is therefore proportional to the strength of the input signals to the comparator 7 and provides a related balance position with respect to the collector 17.

The output of the summing impact modulator 2 is supplied to the pneumatic relay 1 to position it in accordance with the output pressure. A portion of the output signal is fed back through the gain adjustment restrictor 14 to the feedback nozzle 17. Consequently, the output of the summing impact modulator 2 is an error signal which is proportional to the difference between the summated input signal and the feedback signal. When the forward gain of the relay 1 and the summing impact modulator 2 is very large, the ratio of the output pressure to the input pressure is essentially equal to one over the feedback gain which in turn is controlled by the restrictor 14. The system thus provides a fluid proportional controller or operational amplifier with continuously adjustable gain.

The system of the present invention is stable with temperature and errors associated with input signal line losses are essentially eliminated.

In an actual construction similar to that of the drawing, the pneumatic relay 1 had a gain ratio of 10:1 and the summing impact modulator a gain ratio of 8:1 yielding a total forward gain equal to 80:1. The comparator 7 had a gain ratio of 1:1 for the signals of sources 5 and 6 and of 3:1 for the signal of source 4. The latter gain ratio was adjustable to 0:1 by adjustment of a needle valve restrictor 57. In the impact modulator 2, the nozzles 16 and 17 terminated in similar sized orifices of 0.007 inch diameters. The restrictors 51, 58 and 59 respectively had flow resistances of $$\frac{0.26 \text{ pound force minutes } (\#f \text{ min.})}{\text{in.}^5}$$

$$\frac{1.5\# \ f \text{ min.}}{\text{in.}^5}$$

and $$\frac{0.20\# \ f \text{ min.}}{\text{in.}^5}$$

A main air supply of 20 p.s.i.g. (pounds per square inch gauge) was regulated to 9 p.s.i.g. at line 54.

The regulated pressure of 9 p.s.i.g. is a common set point output pressure employed in fluid control systems. Where a different set point output pressure is employed, the controller output is recalibrated following adjustment of the gain by setting of restrictor 14. If desired, the regulator 53 may be adjustable to vary the regulated pressure and thereby permit associated with a variety of different systems having other set point requirements without the necessity of recalibrating the amplifying system with gain adjustment.

The present invention has been found to provide an improved pneumatic control device avoiding some of the inherent problems associated with fluidic devices employing pure fluid amplification and interconnection between the summing impact modulator and the necessary gain and summating devices.

I claim:
1. A fluid controller, comprising:
an input signal comparator having a plurality of input pressure signal means and an output means interconnected to establish an output signal stream proportional to the summation of the input signal pressures, said input signals operating without signal flow,
a summing impact modulator including a pair of opposing nozzle means to establish opposing streams and a collector having output means, the balance position of the streams relative to the collector determining the signal at the output means, a first of said nozzle means being connected to the output means of the comparator,
a fluid relay connected to the collector to produce an amplified output signal, and
a feedback restrictor connected between the output means of the fluid relay and the second of said nozzle means.

2. The fluid operational amplifying system of claim 1 wherein said fluid relay is a leak port valve having a main stream passageway with a movable valve means and a control chamber connected directly to the output means of the collector, the pressure in the control chamber actuating said movable valve means.

3. The fluid controller of claim 1 wherein the signal comparator is a multiple diaphragm input comparator having a plurality of control chambers with common diaphragm walls separating said chambers and a valve control member connected to said diaphragm walls, one of said chambers being an output signal chamber and including a valve means having a valve member connected to the control member to open and close the valve, said valve means connecting the chamber to an exhaust line, the other of said chambers having an input means and being essentially closed,
an air supply line connected to said output signal chamber, and
the first of said nozzle means is connected to the supply line in series with a calibrating restrictor.

4. The fluid controller of claim 1, including:
an air supply means,
a regulator connected to said supply means,
the signal comparator being a multiple diaphragm comparator having a plurality of dead-ended chambers with input taps, said chambers having diaphragm walls connected to position a valve means in said output means and regulate the exhaust air flow from the supply through the valve means, one of the input taps being connected to an adjustable input restrictor and to the regulator in series with a restrictor, and the pneumatic relay includes a leak port between a main air supply chamber and an output chamber and a lid member movably overlying said port, a control chamber connected to the collector of the summing impact modulator and having a movable member connected to the lid to position the lid in accordance with the output signal of the impact modulator.

5. The fluid controller of claim 4 wherein said summing impact modulator includes a first of said nozzle means connected to the regulator and to the comparator in series parallel with an adjustable calibration restrictor and a second of said nozzle means connected to the regulator in series with a restrictor.

References Cited

UNITED STATES PATENTS

| | | | |
|---|---|---|---|
| 2,985,183 | 5/1961 | Peatross | 137—86 |
| 3,105,508 | 10/1963 | Bowditch et al. | 137—82 |
| 3,113,582 | 12/1963 | Hudson | 137—85 XR |
| 3,169,402 | 2/1965 | Baker | 137—85 XR |
| 3,181,547 | 5/1965 | Bennett | 137—82 |
| 3,272,215 | 9/1966 | Bjornsen et al. | 137—81.5 |

SAMUEL SCOTT, Primary Examiner

U.S. Cl. X.R.

137—85